(12) United States Patent
Andrea

(10) Patent No.: US 6,589,104 B2
(45) Date of Patent: Jul. 8, 2003

(54) ELECTRIC CHAIN SAW SHARPENING MACHINE

(76) Inventor: Giovanardi Gian Andrea, Piazzale delle Nazioni 92, 41011 Campogalliano (Modena) (IT)

( * ) Notice: Subject to any disclaimer, the term of this patent is extended or adjusted under 35 U.S.C. 154(b) by 0 days.

(21) Appl. No.: 09/996,460

(22) Filed: Nov. 19, 2001

(65) Prior Publication Data

US 2002/0061719 A1 May 23, 2002

(30) Foreign Application Priority Data

Nov. 20, 2000 (IT) .......................................... BO00A0677

(51) Int. Cl.[7] ................................................ B24B 3/00
(52) U.S. Cl. ........................ 451/229; 451/234; 451/545; 76/80.5
(58) Field of Search ................................. 451/229, 541, 451/545, 193, 224, 234, 236, 232, 321, 371; 76/80.5, 42, 25.1

(56) References Cited

U.S. PATENT DOCUMENTS

| | | | | |
|---|---|---|---|---|
| 3,071,026 A | * | 1/1963 | De Witt | 76/40 |
| 3,349,645 A | * | 10/1967 | Silvey | 76/40 |
| 3,695,123 A | * | 10/1972 | Silvey | 76/43 |
| 3,717,051 A | * | 2/1973 | Silvey | 76/37 |
| 3,779,103 A | * | 12/1973 | Silvey | 76/40 |
| 4,287,793 A | * | 9/1981 | Silvey | 76/42 |
| 4,299,142 A | * | 11/1981 | Kaye | 451/232 |
| 4,336,726 A | * | 6/1982 | Silvey | 76/80.5 |
| 4,416,169 A | * | 11/1983 | Silvey | 76/33 |
| 4,594,920 A | * | 6/1986 | Ziegelmeyer | 76/42 |
| 4,732,056 A | * | 3/1988 | Foster | 451/72 |
| 4,762,027 A | * | 8/1988 | Fagiolini et al. | 76/80.5 |
| 4,836,058 A | * | 6/1989 | Shepherd | 76/40 |
| 5,033,333 A | * | 7/1991 | Shepherd | 76/37 |

* cited by examiner

Primary Examiner—Joseph J. Hail, III
Assistant Examiner—Hadi Shakeri
(74) Attorney, Agent, or Firm—Bradley Arant Rose & White LLP

(57) ABSTRACT

The present invention relates to an electric sharpening machine for chain saws capable of correctly sharpening the teeth at any number of desired cutting angles within a given range; this system according to the invention allows rotation of an upper portion of the saw, including the motor and the grinding wheel. The chain to be sharpened can be progressed and automatically gripped by the lowering of the grinding wheel into a grinding position. The chain may be turned 180° for grinding opposing teeth when the upper part is rotated into a complimentary position. In this way it is possible to let the abrasive grinding wheel sharpen the saw teeth, both in case of left and right teeth, with rotation occurring towards the inner part of the teeth and opposite to the position of the operator for avoiding ejecting dangerous sparks and materials at the operator.

4 Claims, 13 Drawing Sheets

Standard

Side Plate Angle

Top-Plate Filing Angle

Top-Plate Cutting Angle

Right-hand Cutter Sharpening

Left-hand Cutter Sharpening

ELECTRIC CHAIN SAW SHARPENING MACHINE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Preliminary statement: in order to better understand how to use the sharpening machine and the features of the present invention, a short description of chain saws is necessary. Saws are generally formed by a series of driving chains with a thickness variable from 1.1 mm to 2.0 mm, but some special chains reach a thickness of 3.1 mm. See, FIG. 2. The links of these chains are joined to each other by a couple of jointing or connection links fixed by means of rivets allowing the articulation of the chain. See, FIG. 3. In the standard saw the driving links are connected to a connection link, which, in turn, is connected to a link with a special form having a tooth with an edge which is always turned towards the inside of the cutting chain; this tooth will be named right or left (FIGS. 2 and 3). Each tooth has a profile with an upper cutting angle and a lateral cutting angle (FIG. 4), these angles need to be perfectly sharpened, with the true and same angle either in case of right or left. In this way, the teeth come into the wood and remove shavings from the log in a perfectly identical way, which serves to reduce or prevent excessive stress during operation. In order to reinforce the hardness of the teeth, manufacturers typically coat the external surfaces of the teeth with a layer of chrome to give the metal a better resistance against the cutting stress on the wood.

During sharpening by use of grinding wheels the chrome-coated cutting part of the tooth may overheat. Because of the rubbing, some little metal feather edges and some little irregularities of the lateral and upper cutting angle are formed, but only on the internal part with respect to the rotation of the grinding wheel (e.g., that edge of the surface being ground at which the grinding wheel ceases to touch the tooth in revolution). That external part (which is the first one to be touched) remains perfectly regular and well sharpened.

Up to some years ago, the electric sharpening machines for chain saws were expected to have a double rotation of the motor and, consequently, of the grinding wheel connected to the motor, in order to obtain proper rotational direction for removing material from the tooth without creating feathers on the leading cutting edge; this rotational direction was always from the external part towards the inner part (FIG. 5, drawing 1) both in case of right and left teeth. If the feather edges and the irregularities are turned towards the inside of the tooth, the external cutting edge maintains the chrome layer and it presents a perfect cutting angle.

When sharpened in this manner, the cutting chain and the chain saw will work better when cutting through wood with less stress, thereby resulting in a more accurate cut.

The introduction of certain rules referring to operator safety in some jurisdictions (e.g., in Europe, rule CE 89/39 No. 73/23 No. 89/336, including integration, updates and amendments) forbids removal of material from the tooth of the saw in a manner that causes the sparks to fly towards the operator. Of course, potential for serious injury to the operator is present from grinding wheel breakage as well as removal of metal particles from the saw in the direction of the operator.

On the other hand the operator, for an accurate sharpening, needs to keep a good visibility on the contact point between the grinding wheel and the tooth. Accordingly, design of safety shields and other protective arrangements is difficult to accomplish without sacrificing function of the sharpener. For this reason present manufacturers have chosen a solution which provides only a single rotation direction for the electric motor (and consequently for the grinding wheel connected to the motor); this direction being opposite to the position of the operator. Due to this choice, the current sharpening machines are incapable of multiple positioning that would accomodate perfectly identical sharpening of the right and left teeth, respectively, of the chain saw cutting tooth.

OBJECTS OF THE INVENTION

The objects of the present invention are, therefore, the following:

1. To create an electric sharpening machine which assures maximum safety for the operator that complies with current European regulations in force, while at the same time allowing the sharpening of both right and left teeth of a saw by means of a rotation of the grinding wheel that turns in rotational direction from the external part of each tooth towards the inner part (following the upper and lateral cutting angle of the saw teeth).

2. To provide an electric sharpening machine that is easily adjustable and that accommodates reduction of waste of time by the operator.

3. To provide a sharpening device that during the sharpening can stop the cutting chain to be sharpened between the two jaws by a mechanical system, without any further manual actions by the operator.

Yet another feature of the device is the ability to stop the chain to be sharpened in the jaws of the vice, which is present at the base. By lowering the upper portion of the device, including the motor and the grinding wheel, about a first axis from an upper position in which it does not contact the chain, toward the base and lower position in which it may contact the chain, an actuating spring B10 is stressed acting an arm B11, which, in its turn, acts as a lever on the shaped block B12 exerting a pressure on the inner jaw through contact with the protruding part B13, causing it to adopt a closed configuration, which stops the tooth to be sharpened (FIG. 1).

The following describes in detail an example of an embodiment, but shall not be interpreted to limit the invention to the detail described.

BRIEF SUMMARY OF THE INVENTION

In the manner above, the sharpening machine according to the invention solves the current problems concerning sharpening and safety, by solving contemporaneously the objects listed above 1 and 2. The present invention provides an electric sharpening machine for chain saws capable of correctly sharpening the teeth at any number of desired cutting angles within a given range; this system according to the invention allows rotation of an upper portion of the saw, including the motor and the grinding wheel about an axis that is parallel to the grinding wheel and immediately below the grinding wheel when the grinding wheel is in the perfectly vertical position. The chain to be sharpened can be progressed and automatically gripped by the lowering of the grinding wheel into a grinding position. The chain may be turned 180° for grinding opposing teeth when the arm A2 (and hence the entire upper part) is rotated into a complimentary position. In this way it is possible to let the abrasive grinding wheel sharpen the saw teeth, both in case of left and right teeth, with rotation occurring towards the inner part of the teeth and opposite to the position of the operator for avoiding ejecting dangerous sparks and materials at the operator.

DETAILED DESCRIPTION OF THE INVENTION

Figure 4:
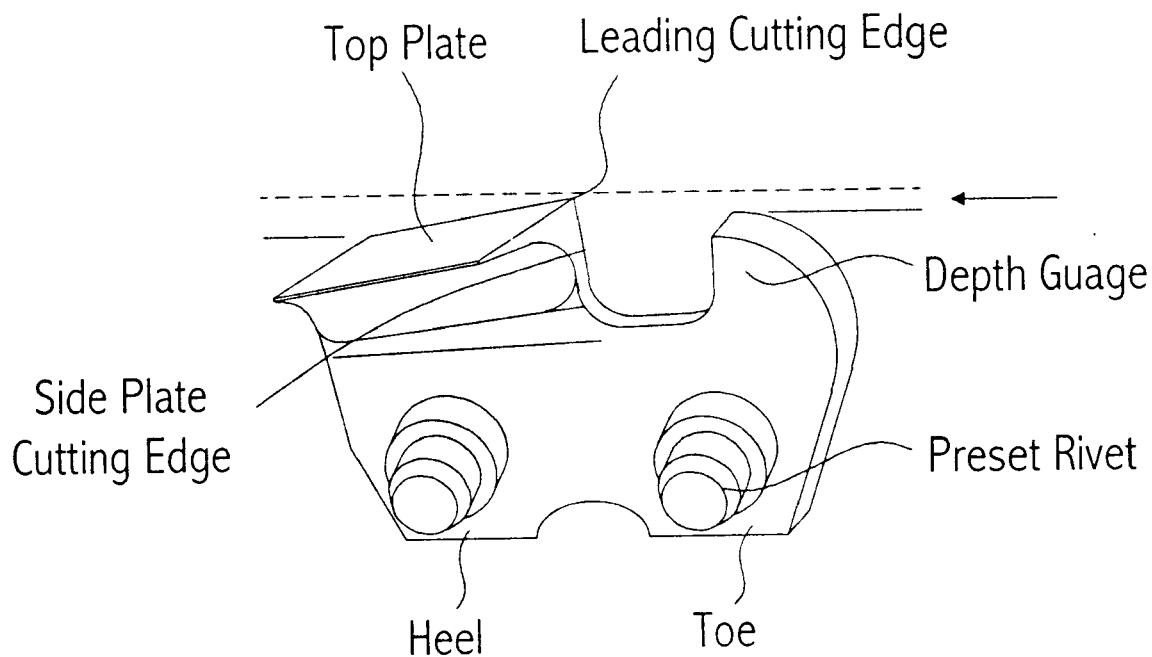
FIG. 4 shows a close detail of a typical cutter tooth of a chain saw, with reference to the cutting angles (PRIOR ART)
Figure 4:
Figure 4:
Figure 4:
Figure 6:
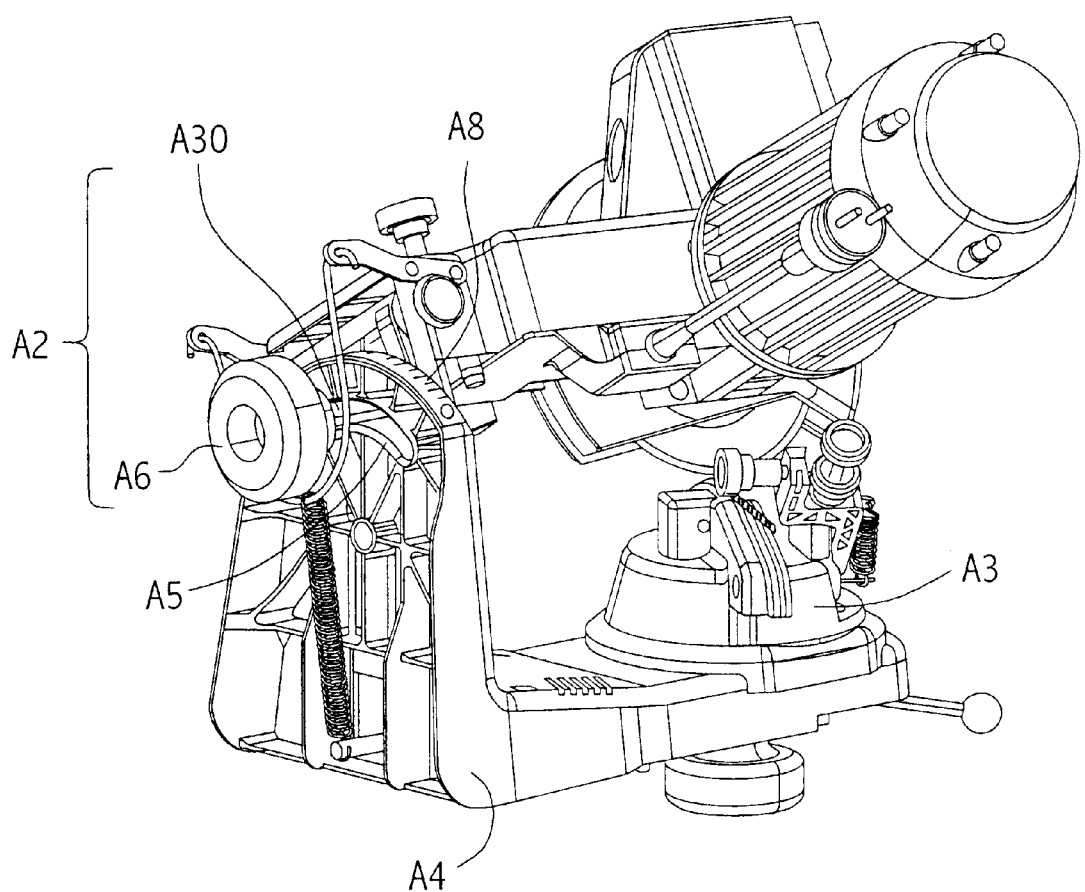
FIG. 6 shows a view of an embodiment of the present invention from the rear of the motor-mounted side of the arm, from which can be seen the rotatable saw holder (A3) and the pivoting of the arm about an axis near A6
Figure 7:
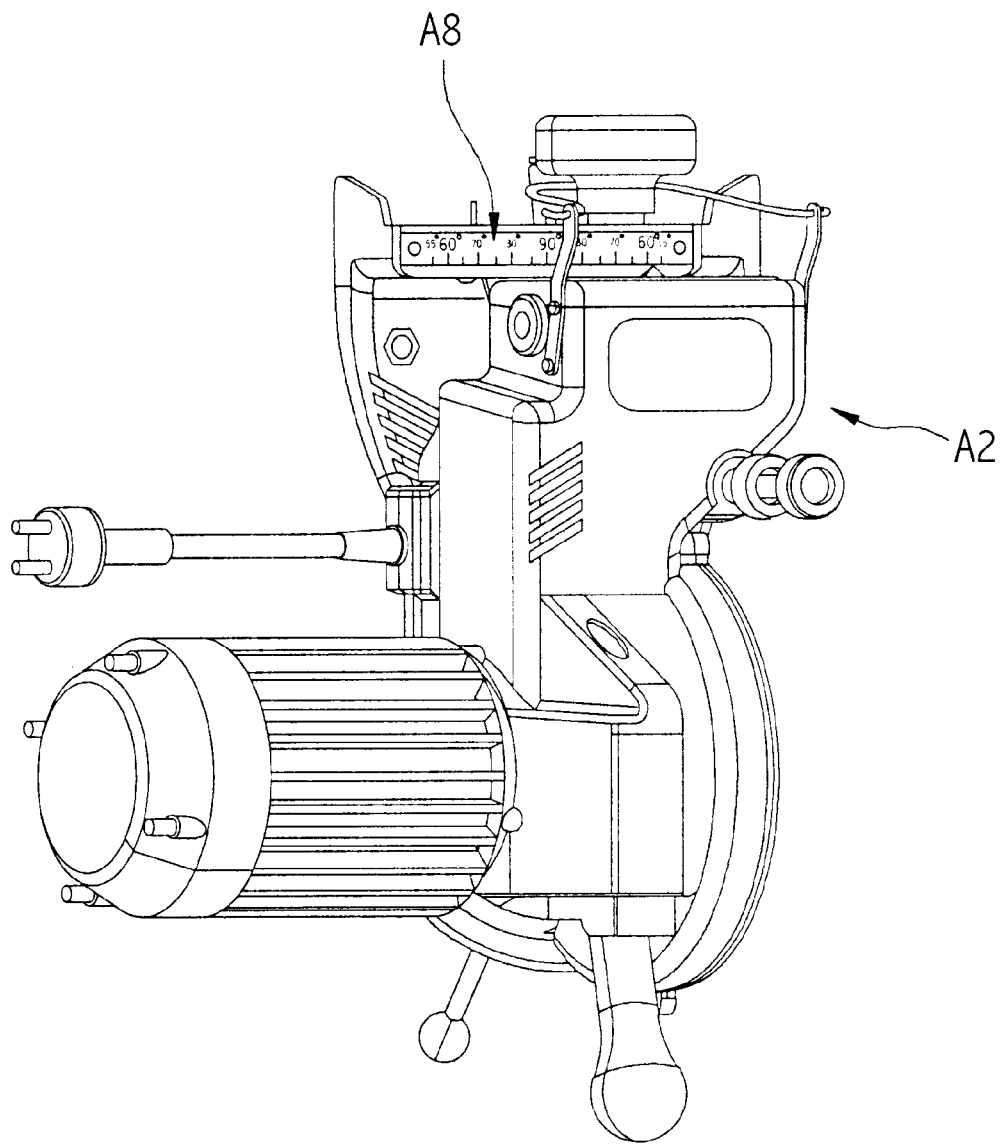
FIG. 7 shows a top-down view of an embodiment of the present invention.
Figure 8:
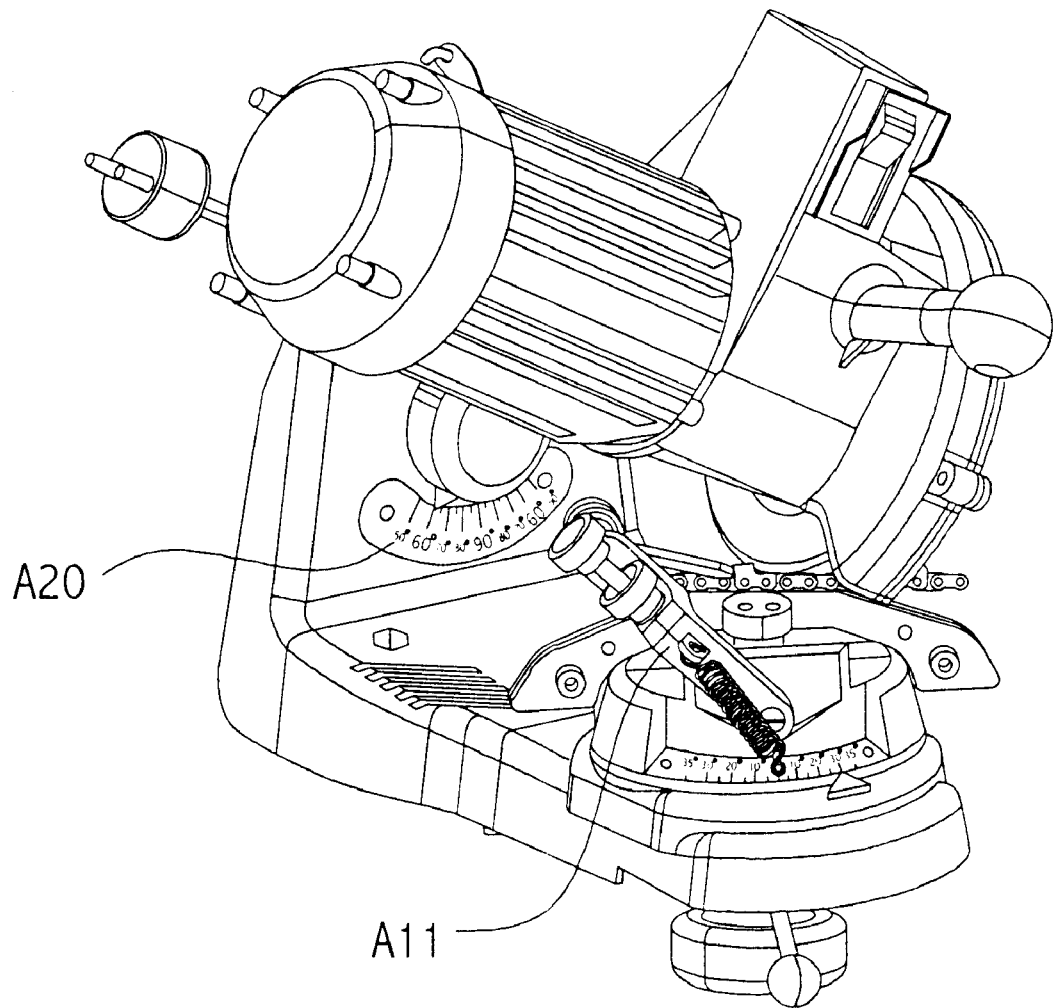
FIG. 8 shows a view of an embodiment of the present invention from the front of the motor-mounted side of the arm, from,which can be seen the vice spring associated with the vice body.
Figure 9:
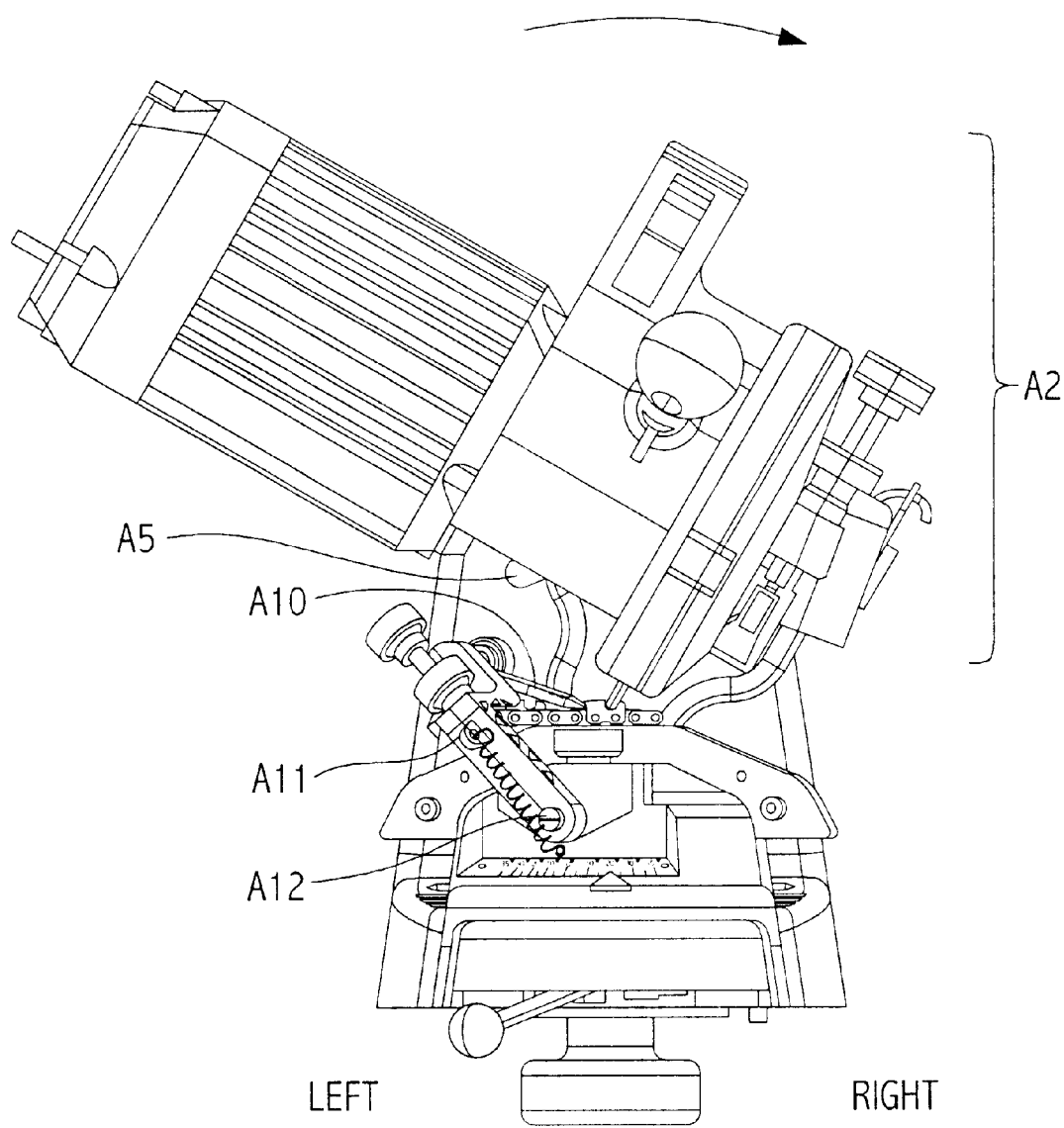
FIG. 9 shows an operator's view of an embodiment of the present invention, with the arm configured as rotated to the right
Figure 10:
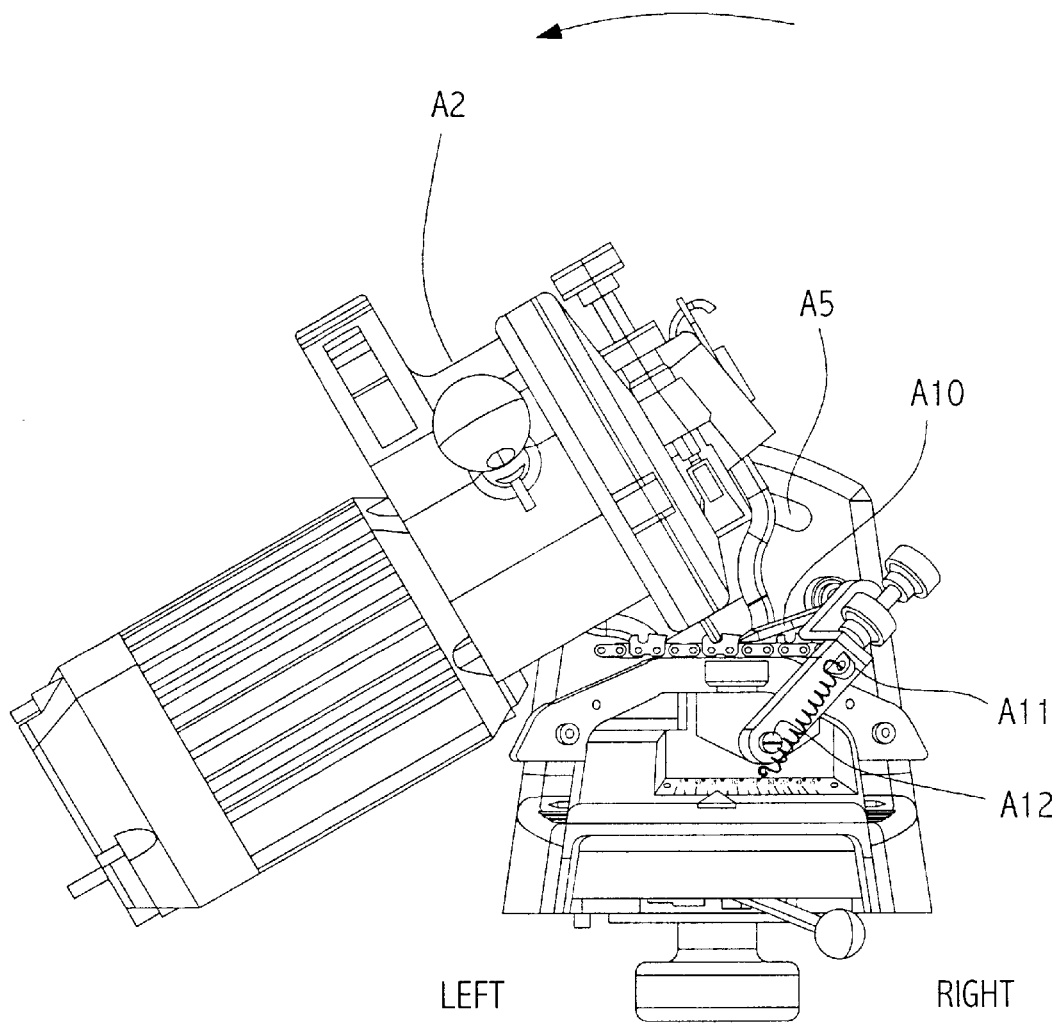
FIG. 10 shows an operator's view of an embodiment of the present invention, with the arm configured as rotated to the left.

The upper part of the machine (arm A2) and the lower part (base A4) are configured in order to allow an 80° side-to-side rotational range for movement of the arm A2 (and thereby the entire upper part) as indicated by the arcuate arrows labeled A40 in FIGS. 9 and 10. The arm A2 (and thereby the entire upper part) is secured in place by a variably securable and releasable pilot A30 in the groove A5 situated on the base A4 (FIG. 6). Accordingly, the arm A2 (and thereby the entire upper part) can be stopped at or moved through all the spaces (intermediate positions) included between 40° on the right (corresponding to 50° on the graduated scale A8) and 40° on the left (that is 50° in this direction) (FIG. 7) with respect to the central axis (90°), which as demonstrated by comparative reference to FIG. 9 and FIG. 10 is substantially parallel to the plane of the grinder and extends substantially horizontally from the front of the base to the rear of the base, allowing such side-to-side rotation as depicted in the figures. In order to reposition the arm A2 (and thereby the entire upper part) at a desired angle it is enough to unscrew the handle A6 situated on the back of the sharpening base and place it where wished (as a person of ordinary skill in the art knows, this angle must correspond to the lateral cutting angle of the tooth as suggested by the saw manufacturers (FIG. 4) in order to place the grinding wheel perfectly parallel to the inclination of the tooth). The correctness of this angle may be determined with reference to the inclination angle of the arm A2 on the graduated scale A20, which is situated on the front of the base, or on the graduated scale A8, which alternately is situated on the milled surface of the back part (FIGS. 7, 8). When the arrow marker inscribed the arm corresponds to the desired angle, the handle A6 is screwed into tight arrangement again (FIG. 6) to secure the arm A2 in the desired position.

In order to correctly sharpen the light teeth, the arm A2 must be located in the angle corresponding to the upper cutting angle (FIG. 4) of the tooth, but always on the right part (looking towards the front of the base) (FIG. 9).

Figure 11:
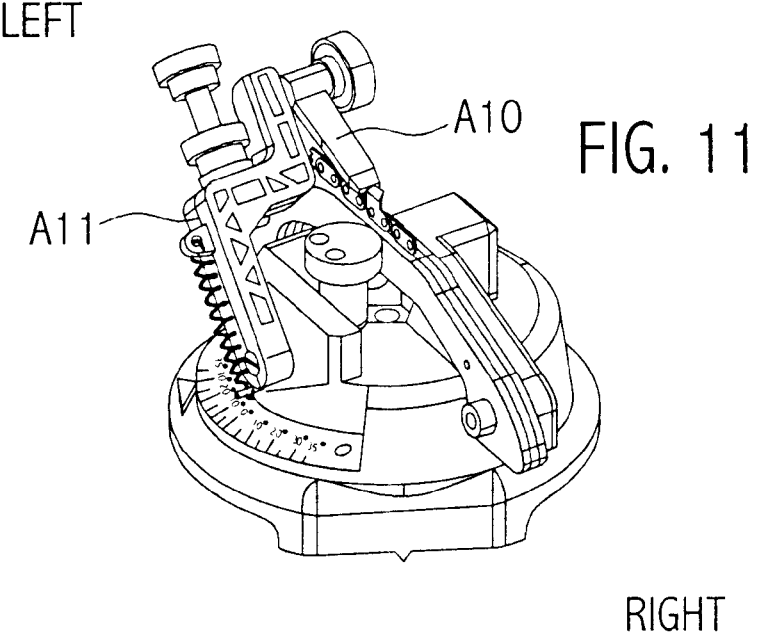
FIG. 11 shows a close-up view of the chain holder assembly of an embodiment of the present inventions, including vice spring.

A chain stop A10 is situated on the left side of the operator and it secures the back of the tooth (FIG. 11). In this position the grinding wheel will sharpen all the series of the right teeth always by touching first the external part and by leaving any burr and impurity on the inner side only.

Figure 12:
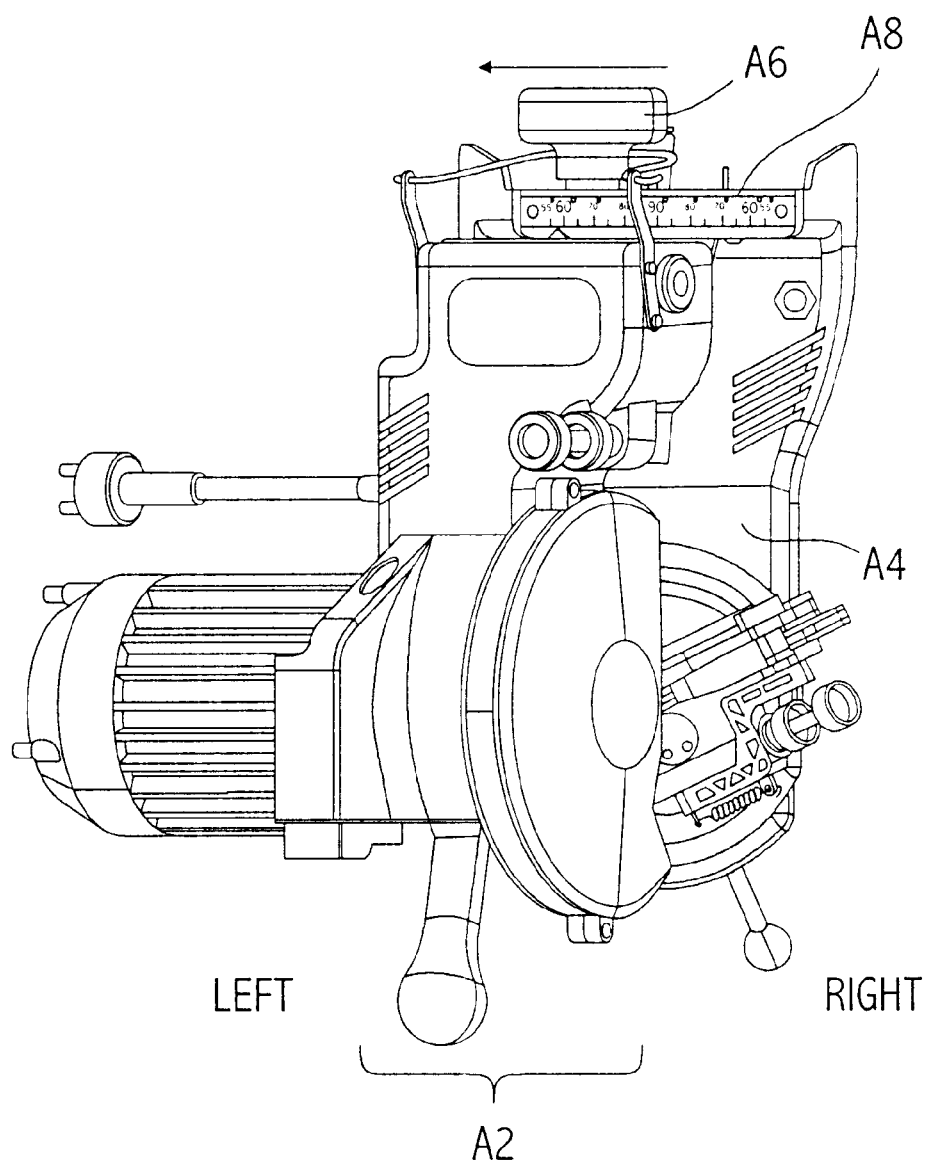
FIG. 12 shows a top-down view of an embodiment of the present invention, with the arm pivoted to the left.
Figure 13:
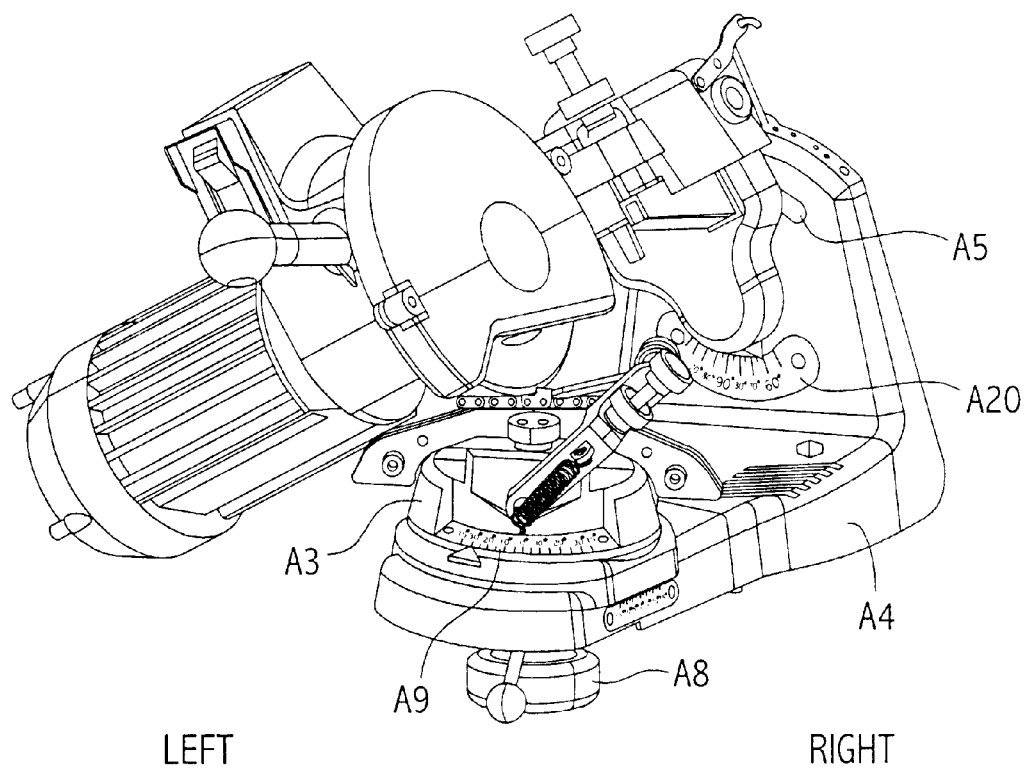
FIG. 13 shows a perspective view of an embodiment of the present invention, with the arm pivoted to the left.

By contrast, to correctly sharpen the left teeth according to the invention, it is possible to act as follows. The rear handle A6 is unscrewed and the arm A2 is released. The arm A2 is rotated and located on the same angle, but in the symmetrically opposite part (for example if it was in the angle 60° on the right, it should move up to 60° on the left side) (FIG. 12). The arm is fixed by clamping the handle A6. After this operation the angle of the vice is changed: the lower handle A8 is unscrewed releasing the vice A3 (FIG. 13).

Figure 14:
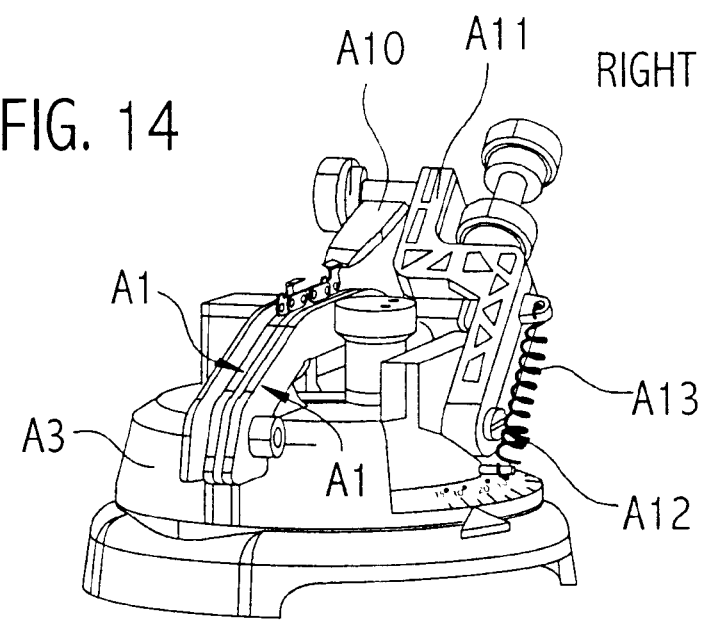
FIG. 14 shows shows a close-up view of the chain holder assembly of an embodiment of the present inventions, as rotated to allow sharpening of opposite handed teeth to those in FIG. 11.

The vice is rotated and located in an angle identical but opposite to that one used to sharpen the right teeth. By way of example, if, while sharpening right teeth an angle of 30° were employed (this angle corresponds to the upper sharpening angle as called by the saw manufacturers, FIG. 4), the vice must be rotated and fixed at 30° on the left (FIG. 13). It is possible to read this angle on the proper graduated scale A9 situated on the front part of the arm. This rotation must be done for every kind of electrical sharpening machine when a series of teeth is sharpened before passing to another series of teeth in the opposite direction. At this point the saw chain is removed from the housing between the two jaws and it is rotated of 180° so that the side, which before was the external one (turned towards the operator), now is the inner side. The saw chain is inserted again between the jaws A1. Now it is necessary to correctly place again the chain stop on the rear part of the tooth. In order to allow this movement, a movable connecting rod A11 (in prior art sharpening machines it is not movable, but it is fixed on the left side of the vice) has been provided on a pivot A12 and kept in tension with the vice body A3 by a vice spring A13 (FIG. 14). This vice spring allows the correct, total and fast displacement of the connecting rod A11 from the right side to the left side, in a special way with respect to the original position. In addition, it allows the clamping to the vice body so that the connecting rod and the chain stop cannot displace from the wished position easily.

Figure 5:
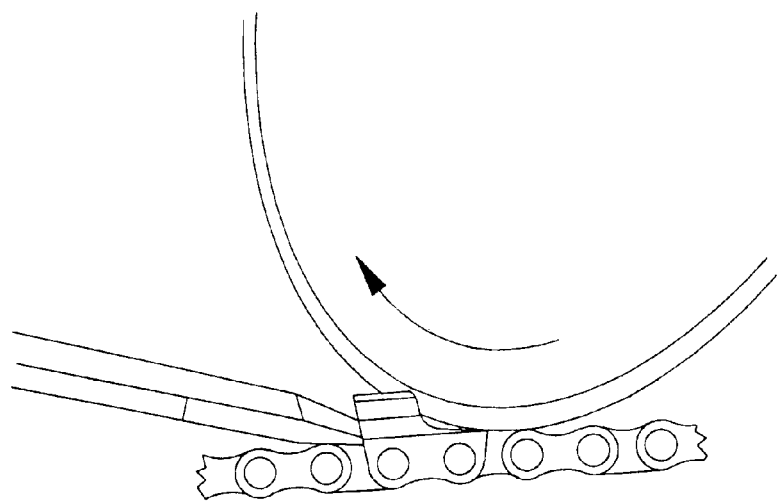
FIG. 5 shows a close up of the sharpening action of an embodiment of the present invention, wherein it can be seen that the rotation of the grinder and arm effects a different sharpening plane for right and left teeth, respectively
Figure 5:
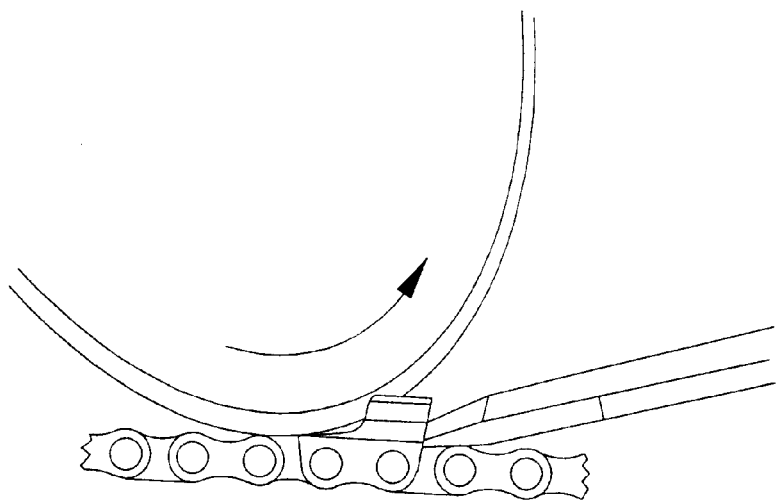

The left tooth is moved up to the chain stop A10 (FIG. 14), without any adjusting, it is now possible to sharpen this series of left teeth also and, as shown, the grinding wheel (keeping its rotation in the direction opposite to the operator, that is in a counter-clockwise direction) will do the sharpening. As with the right teeth, by touching first the external part and successively the inner part of the tooth (FIG. 5 drawing 2), the cutting edge of each tooth is left free of burrs or feathers. For the above mentioned reasons, the external cuttings of all the series of left teeth will be perfectly sharpened, as well as it previously happened for the teeth of the right series.

b) To allow for automated positioning and stopping of chain advancement for further sharpening of teeth, the downward movement has been used (towards the chain tooth located between the jaws A1); this movement must be necessarily carried out by the head of the arm A2 when the saw has to be sharpened. Electrical sharpening machines can be found in the market in which the clamping of the jaws and the consequent stopping of the saw are reached by the operator who must manually act on a lever (for every tooth to be sharpened it is necessary to turn the lever to close the jaws before the sharpening, at the end of the sharpening an opposite, releasing, rotation is required to release it before the progress of the saw chain up to the following tooth). Some other electrical sharpening machines exist presenting a positioning means incorporating a hydraulic system (by means of an oleo piston fixed on one hand to the base and on the other hand to the upper part of the machine) or a pneumatically-acted piston; both systems clamp the saw in the vice. The system according to the invention works in a completely different way.

Figure 1:
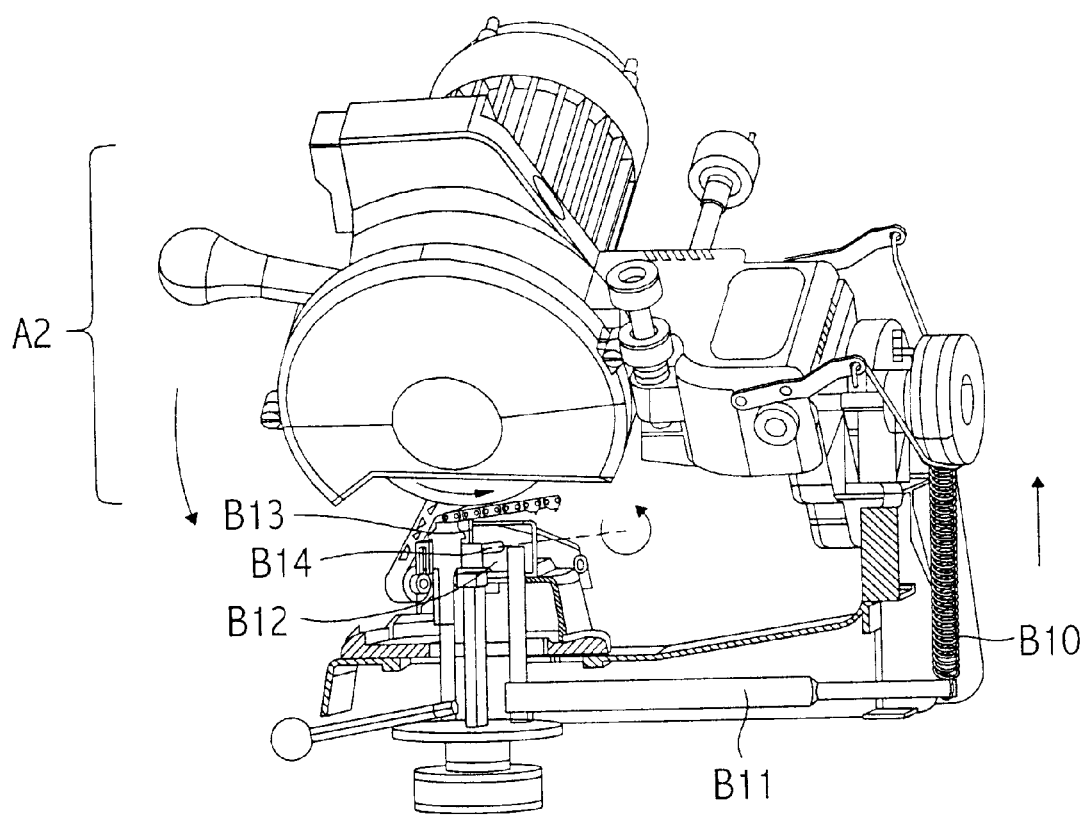
FIG. 1 shows a side view of an embodiment of the current invention, with arros detailing the direction of rotation of the grinding wheel and the downward pivoting motion of the arm.
Figure 2:
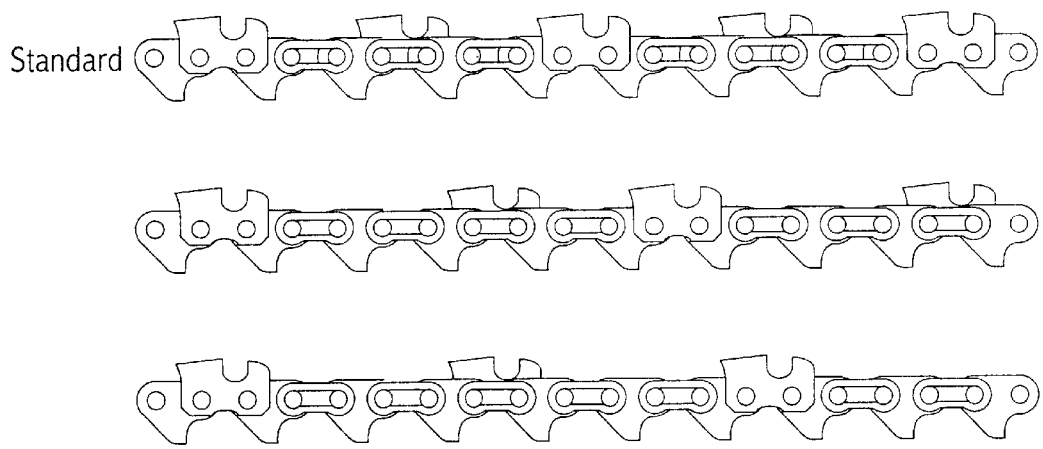
FIG. 2 shows an example of a typical chain saw cutter sequence (PRIOR ART)
Figure 3:
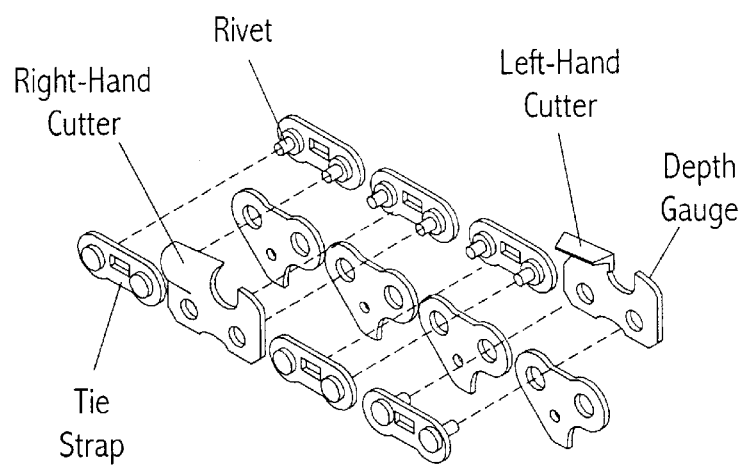
FIG. 3 shows an example of a typical exploded diagram of a chain saw (PRIOR ART)
Figure 15:
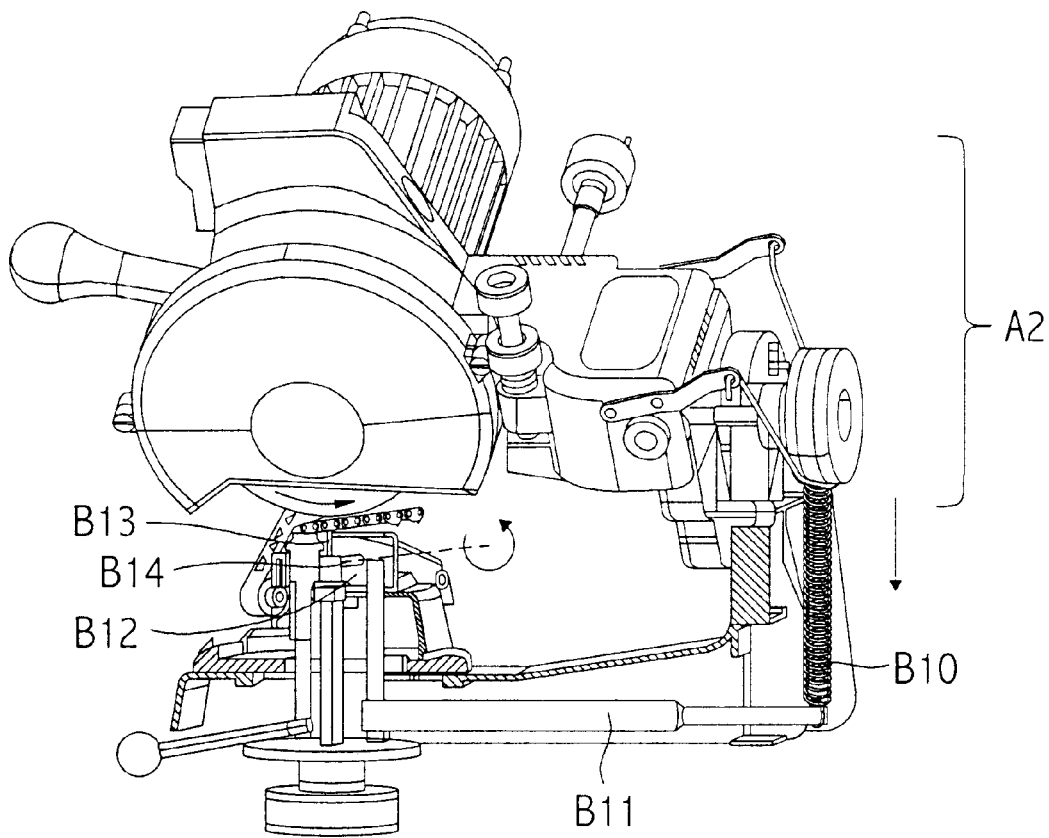
FIG. 15 shows a side view of an embodiment of the present invention, as viewed from the right of the operator.

By lowering the upper portion A2 towards the saw chain and the vice body A3 the actuating spring B10, which is fixed by supporting means to the head, is stressed. The actuating spring acts on the lever B11 lifting its end as shown on the right side of the drawing (FIG. 1). A movement is, therefore, transmitted to the shaped block B12 rotating around a pivot B14 and consequently the protruding part B13 generates a pressure on the inner jaw causing the clamping of the saw chain when the tooth is sharpened. Said pressure is high only when the grinding wheel scrapes off the tooth. By lifting the head again (FIG. 15), the stress on the actuating spring B10 is weakened and the lever B11 and the shaped block B12 come back to the original, open configuration, position. The saw is, therefore, released again. It will be then possible to progress the positioning of the saw chain between the two jaws up to the following tooth to be sharpened.

In other words, it is possible to say as follows:

The sharpening machine for chain saw according to the present invention comprises a rotating grinding wheel connected to an electric motor; by lowering the upper movable arm A2, by means of a mechanical transmission system formed by an actuating spring B10 fixed to the arm and a lever B11 connected to the spring, it is possible to transmit a down movement to a shaped block B12 generating a pressure on the inner jaw of the vice body by rotating around a pivot B14; by which pressure the saw is held in a fixed position during the sharpening time; by lifting again the head the pressure on the actuating spring B10 decreases, the block B12 and consequently the jaw come back to the original position and the saw chain is released again; at this point the operator can manually let the saw chain progress up to the following tooth to be sharpened.

The arm A2, including the motor and the grinding wheel, can rotate both to the right and to the left of the base A4 with respect to the right angle 90° (center of gravity of the base); said rotation is so wide (40° towards the right and 40° towards the left) that it is possible to reach both the right and the left side of the angle corresponding to the upper cutting angle as called by the manufacturers of the chain to be sharpened.

The movement takes place on a groove A5 provided in the base A4 fixed to a support (for example to a working desk); by means of a handle A6 fixed to a movable pilot A30 in the groove, it is possible to fix the arm A2 in all the intermediate positions comprised between 40° (corresponding to the angle 50° of the graduate scale) on the right and 40° (corresponding to the angle 50°) on the left with respect to the center of gravity (right angle) of the base.

The connecting rod A11 to which the chain stop A10 is fixed, is balanced around a pivot A12.

A vice spring A13 is fixed to the balanced connecting rod A11 and to the vice body A3; the stress clamping the connecting rod to the vice body is capable of maintaining position when it is either on the right or on the left side of the base.

SEQUENCE LISTING

Not Applicable

What is claimed is:

1. A sharpening machine for a chain of a chain saw, comprising (f) A base comprising a vice body that comprises at least one movable jaw, said vice body being capable of securing a link of said chain;

(g) An arm pivotally attached to the base and movable between an upper position and a lowered position about a first axis, and also movable in a side-to-side rotational range about a central axis;

(h) An actuating spring connected between the jaw and the arm in such manner that movement of the arm into the lowered position causes the vice body to secure the chain, and movement of the arm into the upper position causes the vice body to release the chain;

(i) An electric motor secured to the arm; and (j) A grinding wheel, operationally attached to the electric motor, whereby lowering of the arm causes the vice to grip the chain until the arm is raised.

2. A sharpening machine as in claim 1, wherein the side-to-side rotational range is so wide that it is possible to reach both a right side angle and a left side angle sufficient to place a grinding surface of the grinding wheel at a desired cutting angle to a tooth of the chain.

3. sharpening machine as in claim 1, further comprising a connecting rod pivotally attached to the vice body, and a chain stop fixed to the connecting rod.

4. sharpening machine as in claim 3, wherein a vice spring is fixed between the connecting rod and a vice body of the jaw in such manner that a stress on the vice body is sufficiently high to clamp the connecting rod to the vice body when the chain stop is positioned for cutting a right side angle and when the chain stop is positioned for cutting a left side angle.

* * * * *